Oct. 27, 1970　　　　　M. LÖHR　　　　　3,536,312
SELF-LEVELLING HYDROPNEUMATIC SHOCK ABSORBER
Filed June 17, 1968　　　　　　　　　　　　4 Sheets-Sheet 1

INVENTOR
MANFRED LÖHR
BY
ATTORNEY

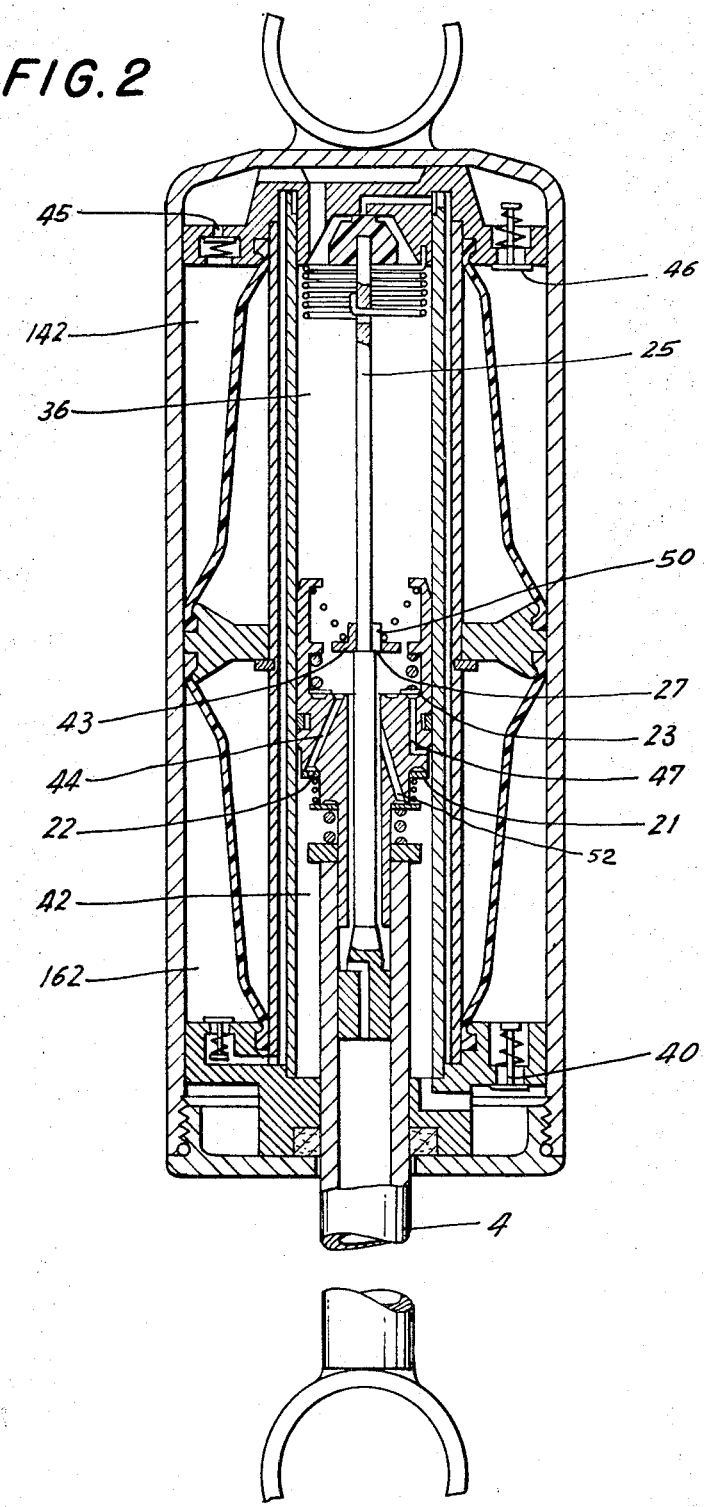

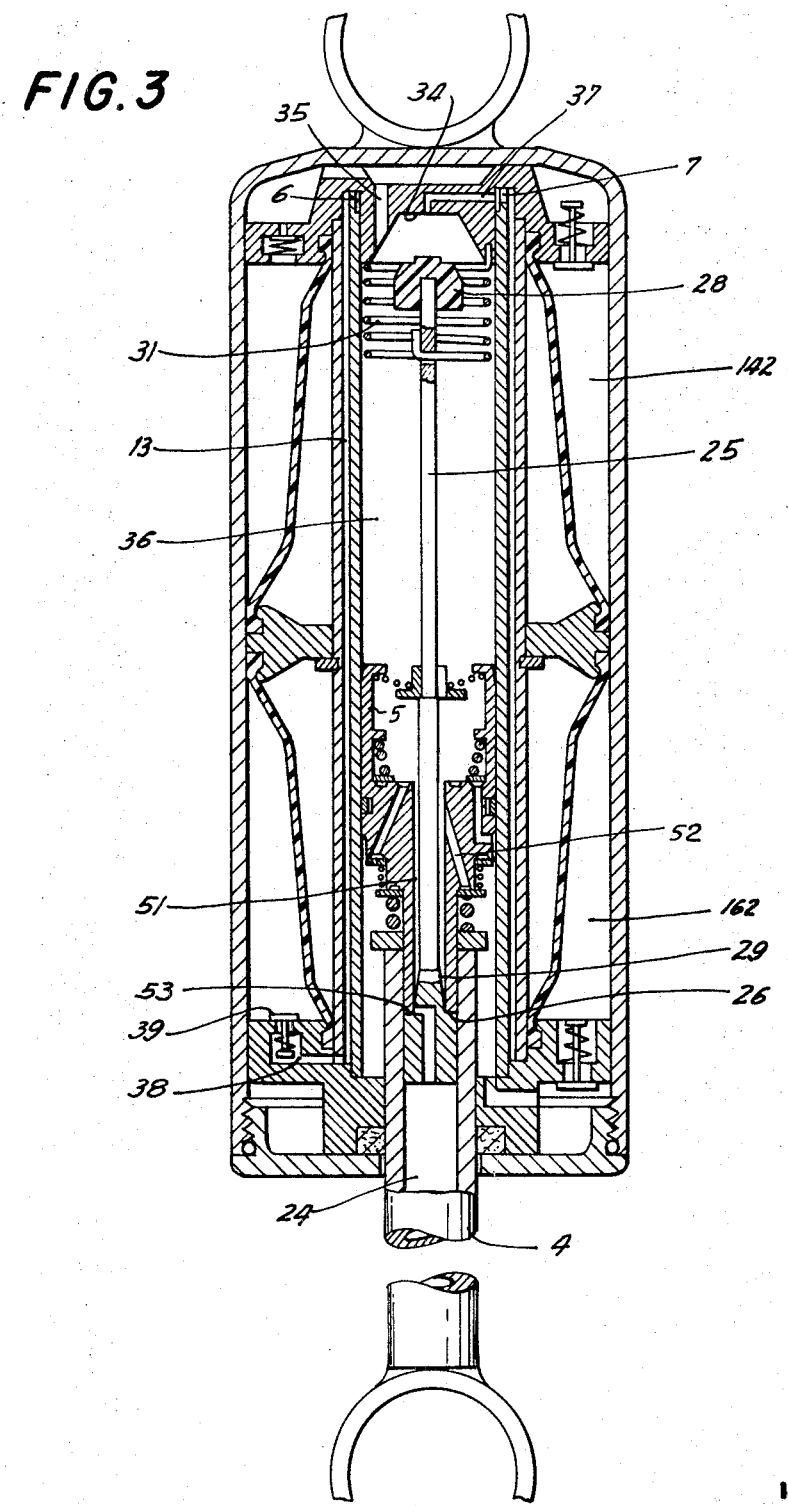

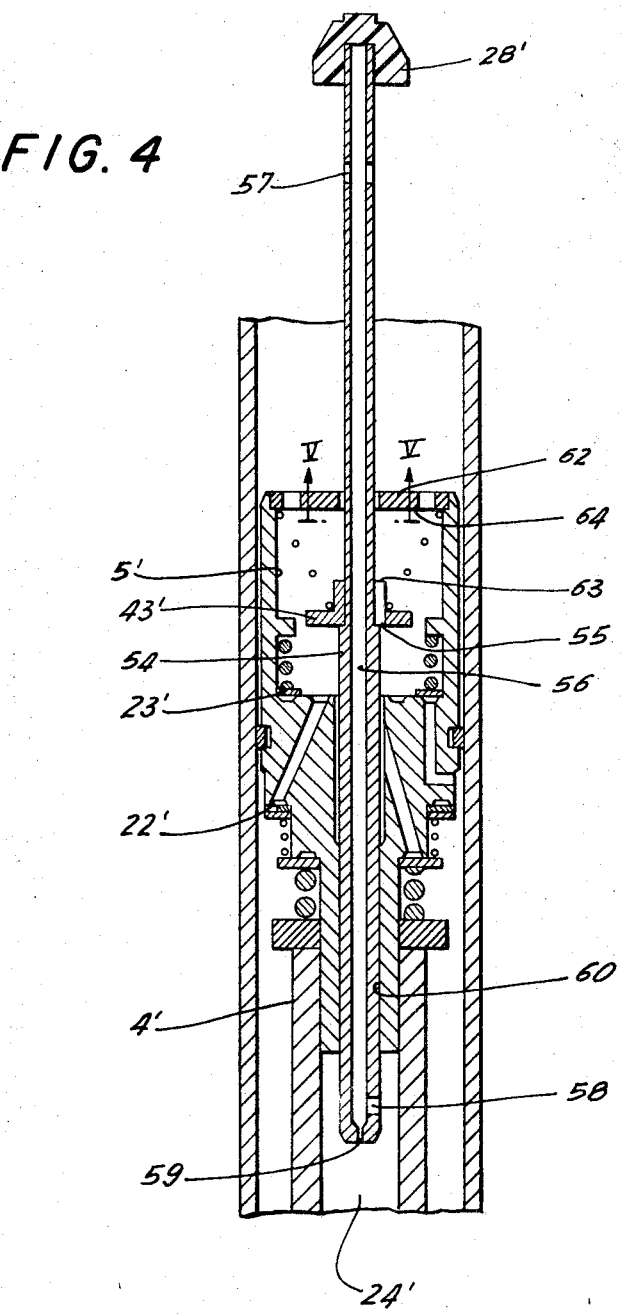

United States Patent Office 3,536,312
Patented Oct. 27, 1970

3,536,312
SELF-LEVELLING HYDROPNEUMATIC
SHOCK ABSORBER
Manfred Löhr, Letmathe, Germany, assignor to Hoesch
Aktiengesellschaft, Dortmund, Germany
Filed June 17, 1968, Ser. No. 737,494
Claims priority, application Germany, June 16, 1967,
H 63,041
Int. Cl. B60g 15/12
U.S. Cl. 267—64                                16 Claims

ABSTRACT OF THE DISCLOSURE

A self-levelling hydropneumatic shock absorber wherein outward movements of the piston rod are damped by orifices and valves provided in the piston and also by orifices and valves installed in a partition which separates one chamber of the cylinder from a working compartment containing pressurized liquid. Inward movements of the piston rod are damped by orifices and valves provided in the partition. A regulator which is slidable in the piston rod and controls the position of a sealer and the flow of liquid into and from the one cylinder chamber maintains the piston rod in a neutral position during normal operation of the shock absorber.

CROSS-REFERENCE TO RELATED APPLICATION

The shock absorber of the present invention constitutes an improvement over and a further development of the shock absorber which is disclosed in my copending application Ser. No. 645,298 filed June 12, 1967 and assigned to the same assignee.

BACKGROUND OF THE INVENTION

The present invention relates to improvements in self-levelling shock absorbers for use in automotive vehicles or the like. More particularly, the invention relates to improvements in self-levelling hydropneumatic shock absorbers.

It is already known to provide a shock absorber with two liquid-filled compartments wherein the liquid bodies are pressurized by gaseous cushions and wherein the flow of liquid out of and into such compartments is regulated in dependency on the stresses to which the shock absorber is subjected in use.

It is also known to employ in a hydropneumatic shock absorber an auxiliary piston which regulates the flow of liquid therein. A drawback of such shock absorbers is that the auxiliary piston produces considerable friction and contributes to the initial cost and space requirements of the shock absorber. The auxiliary piston must travel along several ports, bores, orifices, slots and like openings which are provided in its cylinder; this brings about rapid wear on the piston and cylinder and affects the regulating action.

It is further known to regulate the flow of liquid by resorting to an elongated plunger which must be finished and fitted into its cylinder with a high degree of precision. Moreover, the length of the plunger exceeds the maximum stroke of the piston rod; therefore, the usefulness of such shock absorbers is very limited.

All of the above outlined conventional shock absorbers share the additional drawback that the damping action in unstressed condition and neutral position of the piston rod is very unsatisfactory because the pressure in the working compartment then equals the pressure in the storage compartment. This affects the operation of the shock absorber, particularly in the no-load and partial-load ranges.

SUMMARY OF THE INVENTION

It is an object of my invention to provide a self-levelling shock absorber wherein the damping action during outward or inward movement of the piston rod can be adjusted at will and wherein the means for producing a damping action in response to outward movement of the piston rod is independent of the means which produces a damping action when the piston rod moves in the opposite direction.

Another object of the invention is to provide a shock absorber which can produce satisfactory damping action when the pistod rod is caused to move with reference to its cylinder in response to minimal, medium-sized or maximal stresses arising when the shock absorber is mounted between the wheel axle and the frame of an automotive vehicle.

The improved shock absorber comprises an elongated housing defining a working compartment and a storage compartment for pressurized liquid, such liquid being preferably pressurized by two cushions of compressed gas in the housing, a hollow piston rod reciprocably extending into and having a piston located in the housing, a cylinder mounted in the housing and reciprocably receiving the piston so that the latter divides its interior into a pumping chamber which draws liquid from the storage compartment when the pistod rod moves inwardly (i.e., deeper into the housing) and a second chamber which receives liquid from the working compartment when the pistod rod moves outwardly, an elongated regulator reciprocably extending into the piston rod in the interior of the housing, a sealer surrounding the regulator in the second chamber to normally seal one end of at least one bore provided in the piston between the two cylinder chambers and being movable by the regulator away from the bore or bores in a predetermined range of axial positions of the piston rod to thereby effect movement of the piston rod to a neutral position, first damping means for damping outward movements of the pistod rod beyond such range of positions including a first damping orifice and a first damping valve provided in the piston to permit liquid flow from the second chamber into the pumping chamber and a second orifice and a second damping valve arranged to permit flow of liquid from the working compartment into the second chamber, and second damping means for damping inward movements of the piston rod beyond the aforementioned range of positions including a third damping orifice and a third damping valve arranged to permit a flow of liquid from the second chamber into the working compartment.

The novel features which are considered as characteristic of the invention are set forth in particular in the appended claims. The improved shock absorber itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a similar axial sectional view but showing the piston rod in a normal second axial position;

FIG. 3 is a similar axial sectional view but showing the piston rod in a third axial position;

FIG. 4 is a fragmentary axial sectional view of a modified shock absorber; and

FIG. 5 is a fragmentary horizontal sectional view as seen in the direction of arrows from the line V—V of FIG. 4.

DESCRIPTION OF THE PREFERRED EMBODIMENTS

Figure 1:
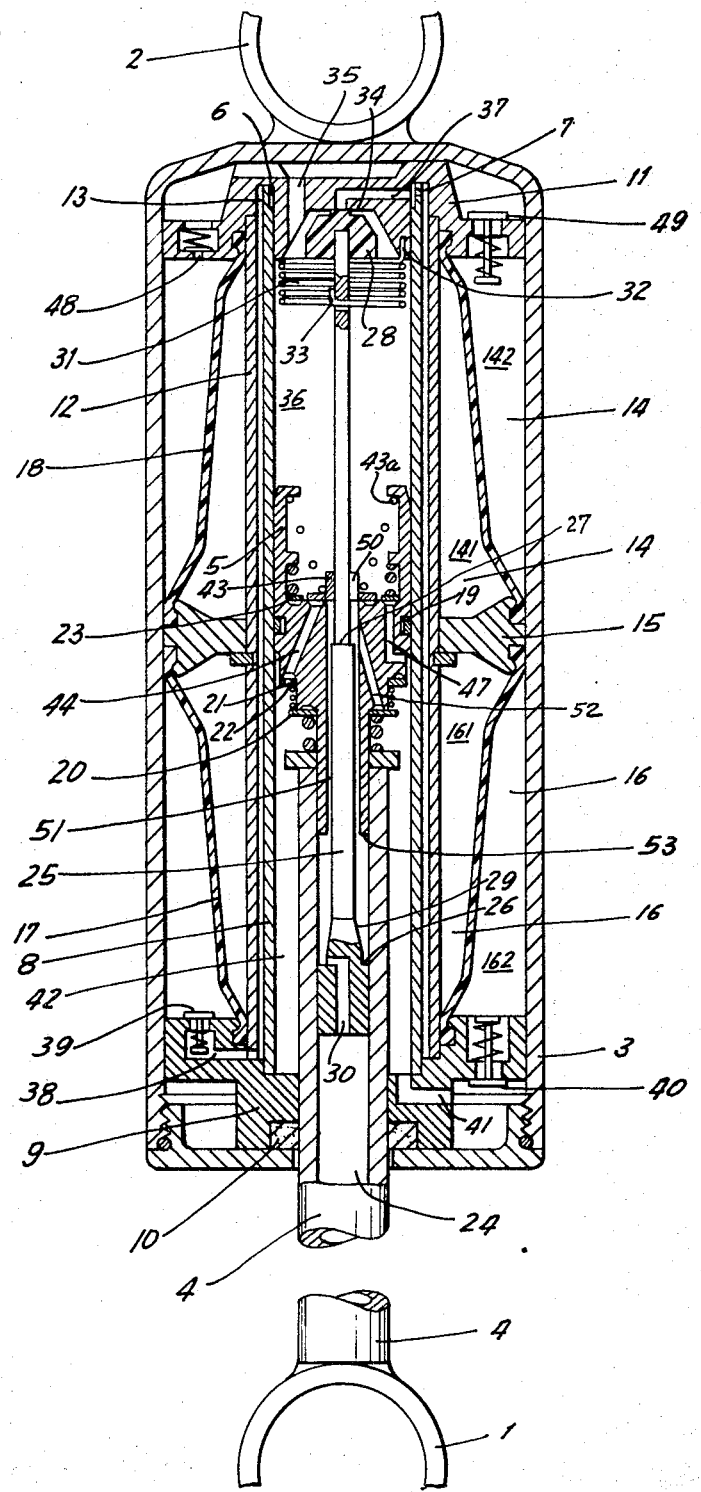
FIG. 1 is an axial sectional view of a shock absorber which embodies one form of my invention, the piston rod being shown in a first axial position.

FIG. 1 illustrates a self-levelling hydropneumatic shock absorber which can be utilized in automotive vehicles. It comprises a lower connector or eye 1 which can be affixed to a wheel axle of a vehicle and an upper connector or eye 2 which can be secured to the frame. An elongated cylindrical housing or shell 3 of the shock absorber has an upper end wall which is rigid with the connector 2 and a lower end wall provided with a central opening for a piston rod 4 the lower end of which is rigid with the lower connector 1. The upper or inner end of the piston rod 4 is rigid with a piston 5 which is slidable in an elongated cylinder 8. The upper end of the cylinder 8 has an internal annular groove 6 and at least one radially extending slot 7 which connects the groove 6 with an annular space 13 provided between the external surface of the cylinder and the internal surface of a cylindrical supporting sleeve 12. The lower end of the housing 3 accommodates a ring-shaped guide or bearing 9 for the piston rod 4, and this bearing accommodates an annular sealing element 10 for the piston rod. The ends of the cylinder 8 and sleeve 12 are received in the bearing 9 and in a ring-shaped partition 11 mounted in the upper end portion of the housing 3.

The median portion of the housing 3 accommodates a ring-shaped divider 15 which separates a storage chamber 16 from a working chamber 14. A flexible diaphragm 17 divides the storage chamber 16 into a liquid-filled outer compartment 162 and a gas-filled inner compartment 161. A similar flexible diaphragm 18 divides the working chamber 14 into a liquid-filled outer compartment 142 and a gas-filled inner compartment 141. The compartments 141, 161 constitute two plenum chambers and serve to pressurize the bodies of liquid in the outer compartments 142, 162. The ends of the lower diaphragm 17 are anchored in the bearing 9 and divider 15, and the ends of the upper diaphragm 18 are anchored in the divider 15 and partition 11.

In order to enhance its pumping action, the piston 5 is provided with one or more piston rings 19. A pressure relief valve 20 is provided in the piston 5 to prevent overstressing by pressurized liquid. Still further, the piston 5 is provided with a one-way check valve 21 having an orifice 22 of predetermined cross section. The orifice 22 serves as a means for producing a damping action during a certain stage of operation of the shock absorber, namely, when the piston rod 4 is being withdrawn and the piston 5 is displaced beyond a certain range of normal positions with reference to the cylinder 8. Such damping action is further produced by a one-way damping valve 23 of the piston. The valves 20, 21 on the one hand and the valve 23 on the other hand permit flow of liquid in opposite directions.

The piston rod 4 is provided with an axially extending blind bore 24 which receives a portion of a rod-shaped regulator 25. The lower end of the regulator 25 is slidably guided in the piston rod 4 and is provided with an upwardly facing annular shoulder 26. A second upwardly facing annular shoulder 27 is provided on the median portion of the regulator 25, and the upper end portion of this regulator carries a valve member 28 which can bear against a seat 34 on the partition 11 to thereby seal a channel 37 of the partition from an upper cylinder chamber or space 36. The lower cylinder chamber or space 42 surrounds the piston rod 4. The lower end of the regulator 25 is provided with a conical damping portion 29 just above the shoulder 26 and with a bore or passage 30 which connects the two halves of the bore 24. A prestressed helical spring 31 has end convolutions 32, 33 which are respectively anchored in the partition 11 and in the regulator 25 so that the spring 31 tends to bias the valve member 28 against the seat 34. The valve member 28 normally prevents flow of liquid between the storage compartment 162 and the upper cylinder chamber 36. The chamber 36 communicates with a bore 35 of the partition 11. The aforementioned channel 37 communicates with the space 13 by way of the groove 6 and slot 7. The lower end of the space 13 between the cylinder 8 and sleeve 12 communicates with a bore 38 which can admit liquid into the storage compartment 162 by way of one or more one-way check valves 39. The storage compartment 162 can discharge liquid into the lower cylinder chamber 42 by way of a one-way check valve 40 and a bore 41 in the bearing 9. The lower cylinder chamber 42 constitutes a pumping chamber of the shock absorber.

The regulator 25 is surrounded by an annular sealer 43 which is biased by a weak spring 43a and normally seals the upper end of at least one bore 44 in the piston 5, this bore 44 serving to convey liquid to or from the orifice 22. When the regulator 25 moves upwardly with reference to the piston rod 4, its shoulder 27 engages and lifts the sealer 43 off the bore 44 against the opposition of the spring 43a. When the piston rod 4 moves upwardly, i.e., when it penetrates into the cylinder 8, the sealer 43 closes the upper end of the bore 44. The check valve 40 in the bearing 9 then opens in response to suction in the pumping chamber 42 and pressurized liquid flows from the storage compartment 162 by way of the bore 41 to enter the pumping chamber 42. At the same time, the piston 5 expels liquid from the cylinder chamber 36 into the working compartment 142 by way of the bore 35, a damping orifice 45, and a one-way damping valve 46, see FIG. 2. The orifice 45 provides a constant-diameter passage between the bore 35 and working compartment 142. This orifice throttles or damps the flow of liquid into the compartment 142 and thereby produces a desirable damping action in response to shortening of the shock absorber, i.e., in response to movement of the connector 1 toward the connector 2 and/or vice versa.

When the piston rod 4 moves outwardly, i.e., downwardly, as viewed in FIG. 1, the check valve 40 in the bearing 9 closes and the liquid which has entered the pumping chamber 42 is expelled by way of the orifice 22 in the check valve 21 (which is closed). Such liquid flows upwardly through the bore 44 and lifts the sealer 43 against the opposition of the spring 43a. Liquid also flows upwardly through one or more bores 47 of the piston 5 and opens the damping valve 23 to penetrate into the upper cylinder chamber 36. Damping action is produced during flow of liquid through the orifice 22 and bore or bores 47. At the same time, liquid can flow from the working compartment 142 into the cylinder chamber 36 by way of a damping orifice 48 and a one-way damping valve 49 in the partition 11, such liquid flowing from the orifice 48 and valve 49 to the bore 35 and thence into the chamber 36. The amounts of liquid entering the chamber 36 correspond to the reduced liquid displacement of the piston rod 4 when the latter moves downwardly. Damping action is produced while the liquid flows through the orifice 48 and valve 49. It will be seen that liquid which was sucked from the storage compartment 162 during upward movement of the piston rod 4 is now located in the cylinder chamber 36 and is in communication with liquid in the working chamber 142 by way of the bore 35 and orifice 45 (FIG. 2). Such liquid raises the pressure in the working chamber 142 by causing greater compression of the gaseous cushion in the compartment 141. Thus, the piston rod 4 is caused to move further, namely, downwardly, as viewed in FIG. 1.

When the shock absorber is overstressed, the relief valve 20 opens and permits liquid to flow from the chamber 36 through a relief channel 50 in the sealer 43 and relief bores 51, 52 into the pumping chamber 42. The pressure of such liquid maintains the one-way check valve 40 in closed position to prevent further outflow of liquid from the storage compartment 162, FIG. 2 illustrates the shock absorber in a neutral or median position in which the sealer 43 is lifted off the upper end of the bore 44 by the shoulder 27 of the regulator 25. When the piston rod 4 moves upwardly, liquid can flow from the chamber 36 through the bore or bores 44 and check valve 21 to enter the pumping chamber 42. Such liquid maintains the check valve 40 in closed position and prevents withdrawal of liquid from the storage compartment 162. The damping action is produced in the same way as described in connection with FIG. 1.

If the shock absorber is not stressed, e.g., if the vehicle is unloaded, the piston rod 4 is moved to the outer end position shown in FIG. 3. The lower end face 53 of the piston 5 then engages the shoulder 26 of the regulator 25 and moves the valve member 28 away from the seat 34 of the partition 11. Liquid can flow from the working chamber 142 by way of the damping orifice 48, damping valve 49, bore 35, channel 37, groove 6, slot 7, space 13 and bore 38 to open the valve 39 and to flow back into the storage compartment 162. The valve member 28 is returned to sealing position (against the seat 34) when the pressure of liquid in the working compartment 142 exceeds the pressure in the storage compartment 162 only to an extent which does not suffice to prevent contraction of the spring 31.

Before the shoulder 26 of the regulator 25 is engaged by the end face 53 of the piston 5, the conical damping portion 29 of the regulator 25 enters the bore 51 of the piston 5 and insures that the flow of liquid from the space 36 into the blind bore 24 of the piston rod 4 is damped and that the lifting force for the regulator 25 is reduced sufficiently to prevent generation of any appreciable noise. The damping action during this stage of operation takes place in the same way as described in connection with FIG. 1; however, when the piston rod 4 moves inwardly, the bore 38 is in communication with the space 36.

An important advantage of the improved shock absorber is that the damping action during outward movement of the piston rod 4 and piston 5 is produced in part by the orifice 48 and valve 49 of the partition 11, and in part by the orifice 22 of the check valve 21 and valve 23 in the piston 5. The valve 49 opens in response to pressure which is produced by the gaseous cushion in the compartment 141. Such distribution of damping action reduces the stresses upon the piston ring 19. The check valve 39 in the bearing 9 produces a damping action when the piston rod 4 moves outwardly in substantially unstressed condition of the shock absorber.

It is also possible to omit the orifice 48 and damping valve 49 and to produce a damping action solely by the orifice 22 and valve 23 when the piston rod 4 moves outwardly. The valve 39 is then omitted and the valve 49 is replaced by a pressure relief valve. Such arrangement can be employed when it is not necessary to produce a strong damping action while the piston rod 4 moves outwardly, for example, when the shock absorber is one of several shock absorbers installed between a wheel axle and the frame of an automotive vehicle, i.e., when the damping action is distributed among several shock absorbers.

The valve 49 in the partition 11 is preferably designed in such a way that it opens at pressures prevailing in the compartment 142 when the piston rod 4 is unstressed. Also, the ratio of cross-sectional areas of the orifices 22 and 48 is preferably such that, when the piston rod 4 is caused to move outwardly, the pressure in the pumping chamber 42 invariably exceeds the pressure in the cylinder space 36.

Each of the damping valves 23, 46, 49 has a seat and a spring-biased plate which normally bears against the respective seat. The orifices 45, 48 are sealed by one-way valves which permit liquid to flow from the bore 35 into the compartment 142 by way of orifice 45 and from the compartment 142 to the bore 35 by way of the orifice 48.

FIG. 4 shows a portion of a second shock absorber. The piston rod 4' is shown in a median position. A regulator 54 carries the valve member 28' at its upper end and has a shoulder 55, an axial bore 56, a diametral bore 57 which can receive the end convolution 33 of helical spring 31 (not shown), a radial bore 58 and a throttling orifice 59. The regulator 54 is received in a bore 60 of the piston 5'. A plate 62 at the upper end of the piston 5' has a circular hole (FIG. 5) surrounding a facetted portion 61 of the regulator 54. The plate 62 closes the upper end of the piston 5' and serves as a bearing or guide for the regulator 54.

The sealer 43' has an end face 63 which abuts against the lower end face 64 of the plate 62 when the piston rod 4' moves downwardly, as viewed in FIG. 4. The plate 62 then entrains the regulator 54 and causes the valve member 28' to move away from the seat 34 (not shown in FIG. 4). The radial bore 58 of the regulator 54 enters the bore 60 of the piston 5' and the liquid which flows through the bores 56, 57 into the blind bore 24' of the piston rod 4' must pass through the orifice 59 whereby the resulting damping action causes the valve member 28' to stay away from its seat. The movements of the piston rod 4' are damped in the same way as described in connection with FIGS. 1 to 3.

Without further analysis, the foregoing will so fully reveal the gist of the present invention that others can, by applyiing current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is:

1. A self-levelling shock absorber, comprising a housing (3) defining a working compartment (142) and a storage compartment (162) for pressurized liquid; a hollow piston rod (4 or 4') reciprocably extending into and having a piston (5 or 5') located in said housing; a cylinder (8) mounted in said housing and reciprocably receiving said piston so that the latter divides its interior into a pumping chamber (42) receiving liquid from said storage compartment when the piston rod penetrates into said housing and a second chamber (36) receiving liquid from said working chamber when the piston rod moves in opposite direction; an elongated regulator (25 or 54) reciprocably extending into said piston rod in the interior of said housing; a sealer (43 or 43') surrounding said regulator in said second chamber to normally seal one end of at least one bore (44) provided in said piston between said chambers and being movable by said regulator away from said bore in a predetermined range of axial positions of said piston rod to thereby effect movement of the piston rod to a neutral position; first damping means for damping outward movements of the piston rod beyond said range of positions, including a first orifice (22) and a first damping valve (23) provided in said piston to permit liquid flow from said second chamber into said pumping chamber, and a second orifice (48) and a second damping valve (49) arranged to permit flow of liquid from said working compartment into said second chamber; and second damping means for damping inward movements of the piston rod beyond said range of positions, including a third orifice (45) and a third damping valve (46) arranged to permit flow of liquid from said second chamber into said working compartment.

2. A shock absorber as defined in claim 1, further comprising a partition (11) provided in said housing (3) between said working compartment (142) and said second chamber (36), said second and third orifices (48, 45) and said second and third damping valves (49, 46) being provided in said partition.

3. A shock absorber as defined in claim 1, further comprising a pair of gaseous cushions provided in said housing (3) to pressurize the bodies of liquid in said compartment (142, 162).

4. A shock absorber as defined in claim 1, further comprising one-way valve means (39) installed in said housing (3) to prevent flow of liquid from said storage compartment (162) into said second chamber (36).

5. A shock absorber as defined in claim 4, further comprising a bearing (9) for said piston rod (4 or 4'), said bearing being mounted in said housing (3) and said one-way valve means (39) being provided in said bearing.

6. A shock absorber as defined in claim 1, wherein said damping valves (21, 46, 49) comprise seats and spring-biased plates bearing against the respective seats.

7. A shock absorber as defined in claim 1, wherein said second damping valve (49) is arranged to open at pressures prevailing in said working compartment (142) when the piston rod (4 or 4') is unstressed.

8. A shock absorber as defined in claim 1, wherein the ratio of cross-sectional areas of said first and second orifices (22, 48) is such that, when the piston rod (4 or 4') is caused to move outwardly the pressure in said pumping chamber (42) exceeds the pressure in said second chamber (36).

9. A shock absorber as defined in claim 1, wherein said piston rod (4') has an axially extending blind bore (24') the open end of which accommodates said piston (5') and wherein said regulator (54) has an axial bore (56), a throttling orifice (59) connecting said axial bore with said blind bore, and a radial bore (58) adjacent to said throttling orifice and communicating with said axial bore.

10. A shock absorber as defined in claim 9, wherein said piston (5') has an axial bore (60) for said regulator (54) and further comprising a guide (62) affixed to said piston and serving as a bearing for said regulator (54).

11. A shock absorber as defined in claim 10, wherein said slider (43') is movable by said guide (62) into engagement with a shoulder (55) of said regulator (54) to shift the regulator axially in response to outward movement of said piston rod (4').

12. A shock absorber as defined in claim 1, wherein said regulator (25) has a conical damping portion (29) which is moved into an axial bore (51) of said piston (5) to produce a damping action in response to outward movement of said piston rod (4).

13. A shock absorber as defined in claim 1, further comprising pressure relief valve means (21) provided in said piston and arranged to open a path for the flow of liquid from said second chamber (36) into said pumping chamber (42) when the pressure in the second chamber exceeds a predetermined maximum value.

14. A shock absorber as defined in claim 13, wherein said first damping orifice (22) is provided in said relief valve (21).

15. A shock absorber as defined in claim 1, further comprising a partition (11) provided in said housing (3) and defining a portion of a passage between said second chamber (36) and said storage compartment (162), said partition defining a seat (34) and said regulator (25 or 54) comprising a valve member (28 or 28') which normally bears against said seat to seal said passage, said second and third orifices (48, 45) and said second and third damping valves (49, 46) being provided in said partition.

16. A shock absorber as defined in claim 15, further comprising prestressed resilient means (31) operating between said regulator (25 or 54) and said partition (11) to bias said valve member (28 or 28') against said seat (34).

References Cited
UNITED STATES PATENTS 3,353,816 11/1967 Axthammer et al. _____ 267—64
3,446,318 5/1969 Duckett _____ 267—64

JAMES R. MARBERT, Primary Examiner

U.S. Cl. X.R.

188—88.1